United States Patent [19]

Moyroud et al.

[11] 4,266,864

[45] May 12, 1981

[54] MASK DEVICE FOR PHOTOCOMPOSING MACHINES

[75] Inventors: Louis M. Moyroud, Delray Beach, Fla.; Grant T. Morgan, Bayshore; Bernard A. Casanova, Brightwater, both of N.Y.

[73] Assignee: Bobst, S.A., Lausanne, Switzerland

[21] Appl. No.: 92,466

[22] Filed: Nov. 8, 1979

[51] Int. Cl.$^{3}$ .............................................. G03B 17/06

[52] U.S. Cl. ...................................................... 354/15

[58] Field of Search ..................... 354/5, 15, 16, 7-11; 355/125

[56] References Cited

U.S. PATENT DOCUMENTS

| | | | |
|---|---|---|---|
| 2,846,932 | 8/1958 | Hooven et al. | 354/9 |
| 3,813,683 | 5/1974 | Purdy et al. | 354/5 X |
| 3,886,566 | 5/1975 | Moyroud et al. | 354/15 |
| 4,027,313 | 5/1977 | Klepper et al. | 354/15 |
| 4,063,812 | 12/1977 | Abraham et al. | 355/125 X |

*Primary Examiner*—Donald A. Griffin

*Attorney, Agent, or Firm*—Curtis, Morris & Safford

[57] ABSTRACT

The character disc of the photocomposing machine has a "sandwich" construction in which the characters are located close to one another on a piece of film which is "sandwiched" between two glass plates. The thickness of this construction is such that the mask would have to be located very precisely in order to select only one character. The mask device consists of a pair of shields, a front shield located between the flash lamp and the spinning disc character matrix, and a rear shield between the matrix and the character magnification lens system. Preferably, the shields are close to the matrix and are fastened together. Each shield has an aperture. The aperture in the front shield preferably is larger than that in the rear shield so that the rear shield blocks rays missed by the front shield. The use of the two shields greatly reduces the precision required in the location of the mask over that required if only one shield were used.

10 Claims, 12 Drawing Figures

MASK DEVICE FOR PHOTOCOMPOSING MACHINES

This invention relates to photocomposing machines and particularly to photocomposing machines designed for use in composing headlines, advertisements and similar graphic material.

It is a major object of this invention to provide a relatively simple, compact and inexpensive photocomposing machine; a machine which is capable of composing characters in a wide variety of sizes, especially larger sizes; a machine which can compose over a wide measure or line length, is relatively easy to use when fitting copy into specific spaces, and in which kerning, white-space reduction and style and case changes can be accomplished simply and easily.

In satisfying the foregoing objectives, the photocomposing machine of the present invention uses a zoom lens for variably magnifying characters to be composed. The zoom lens has a control mechanism which is operated manually by the operator to change the character size. Thus, the expense and power consumption of an electrical motor to do this task is avoided. However, the resolution and accuracy of such a control usually are not very high, with the result that accurate size control is difficult. This problem is solved by the use of a transducer to convert the position of the manual control into digital elecrical signals, and a digital display which indicates the size with a high degree of accuracy.

In one mode of operation, the machine accumulates the widths of characters and spaces between them and displays the accumulated values as the line measure. Another feature of the invention is the provision of means for automatically re-calculating the displayed line measure when the actual or apparent size of the characters is changed. This permits the operator to fit the composed text into the space available for it simply by varying the character size of set until a proper fit has been obtained.

Further objects of the invention are met by the provision of width code storage units each of which stores not only the relative width for a given style of characters, but also kerning values and white-space reduction values for characters in that style. A plurality of these storage devices preferably is provided in the machine so as to accommodate type composition in a plurality of different type styles.

The machine of the invention is able to use segmented character matrix discs—discs made up of a plurality of segments, each bearing a complete font of characters in a distinct style, preferably arranged in concentric circles. The use of segmented discs is facilitated by means of a relatively simple arrangement for changing rows on the disc. Both the timing slit and the character are aligned along the arc of a circle whose axis is offset from the center of rotation of the disc. Thus, the entire disc can be swung about the axis while leaving the slit detector and flash lamp stationary, in order to simply and quickly change from one row of characters to the next. This arrangement also is used when a non-segmented disc is used as the character matrix. Another advantage of this arrangement is to make it easier to remove and replace the matrix disc.

In order to maintain a relatively uniform character density, despite wide variations in the size of the characters, the flash lamp intensity is varied automatically with the variation of size of the type. Also, a diffuser is used at the outlet of the flash lamp in order to ensure relatively uniform distribution of the light over the area covered by All of the foregoing features tend to minimize the number of electrical motors and other power consuming devices required. This reduces the cost of the machine, the size of the machine, and the amount of waste heat to be dissipated. This, in turn, reduces the cost and size of the heat dissipation apparatus required.

As it can be seen from the foregoing, the machine amply fulfills the objects of the invention.

The foregoing and other objects and advantages of the invention will be pointed out in, or apparent from, the following description and drawings.

GENERAL DESCRIPTION

Figure 1:
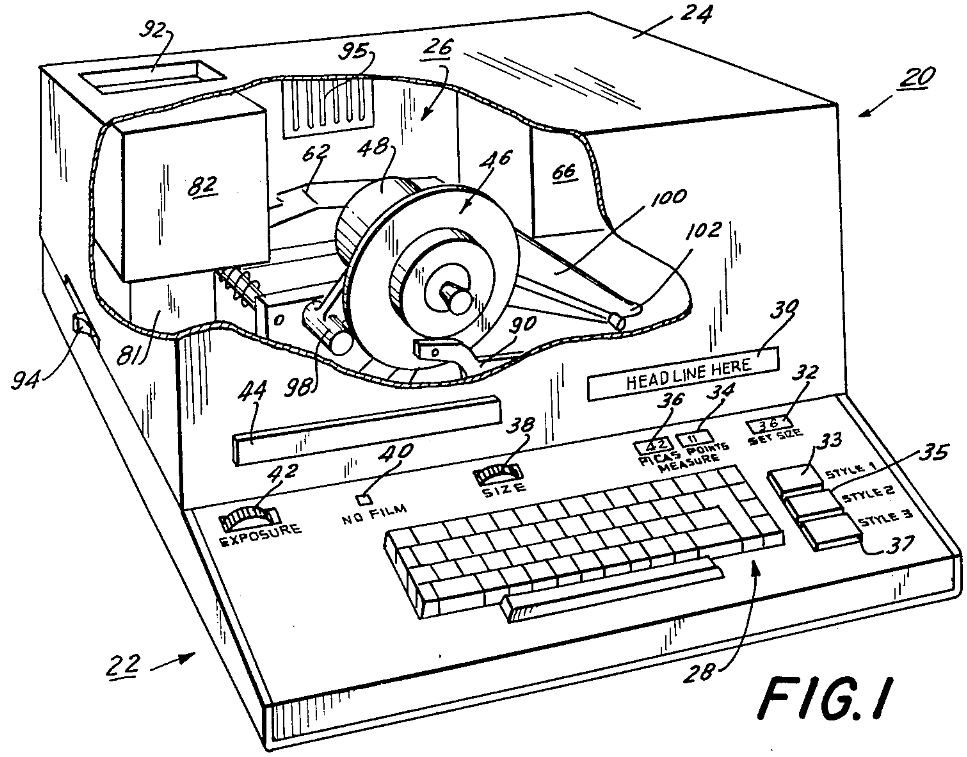
FIG. 1 is a perspective, partially-broken away view of a photocomposing machine constructed in accordance with the present invention.

The photocomposing machine 20 shown in FIG. 1 includes a housing 24, control panel 22, and a photocomposing mechanism 26 mounted in the housing 24.

The controls on the control panel 22 include a key-set 28, and a character display window 30 in which are displayed the most recent 20 characters which have been composed on the machine. In addition, there is a "set-size" display 32 for displaying the point size of the characters being composed. Also, there is a "line-measure" display, including separate windows 36 and 34, for displaying the "measure" or length of the line of characters which has been composed. This measure is displayed in points (window 34) and picas (window 36).

Also provided is a display light 40 to indicate that the machine is out of photographic film or paper. A knob 42 is provided to control the base level of illumination of characters in the machine.

Another knob 38 is provided for controlling the actual size of the characters being composed. A handle 44 is provided to facilitate the lifting of the hinged cover of the housing upwardly to expose the internal mechanism of the machine.

Also on the operating panel 22 are three integrated circuit chips 33, 35 and 37, which are plugged into sockets. Each of these chips is an integrated circuit read-only memory ("ROM") which stores the relative widths, kerning values and white-space reduction values for each of three different styles which may be composed with the machine. Each chip may be unplugged and replaced with another chip for a different style whenever the style of the master characters on the disc is changed, or at any other time, as desired.

Figure 3:
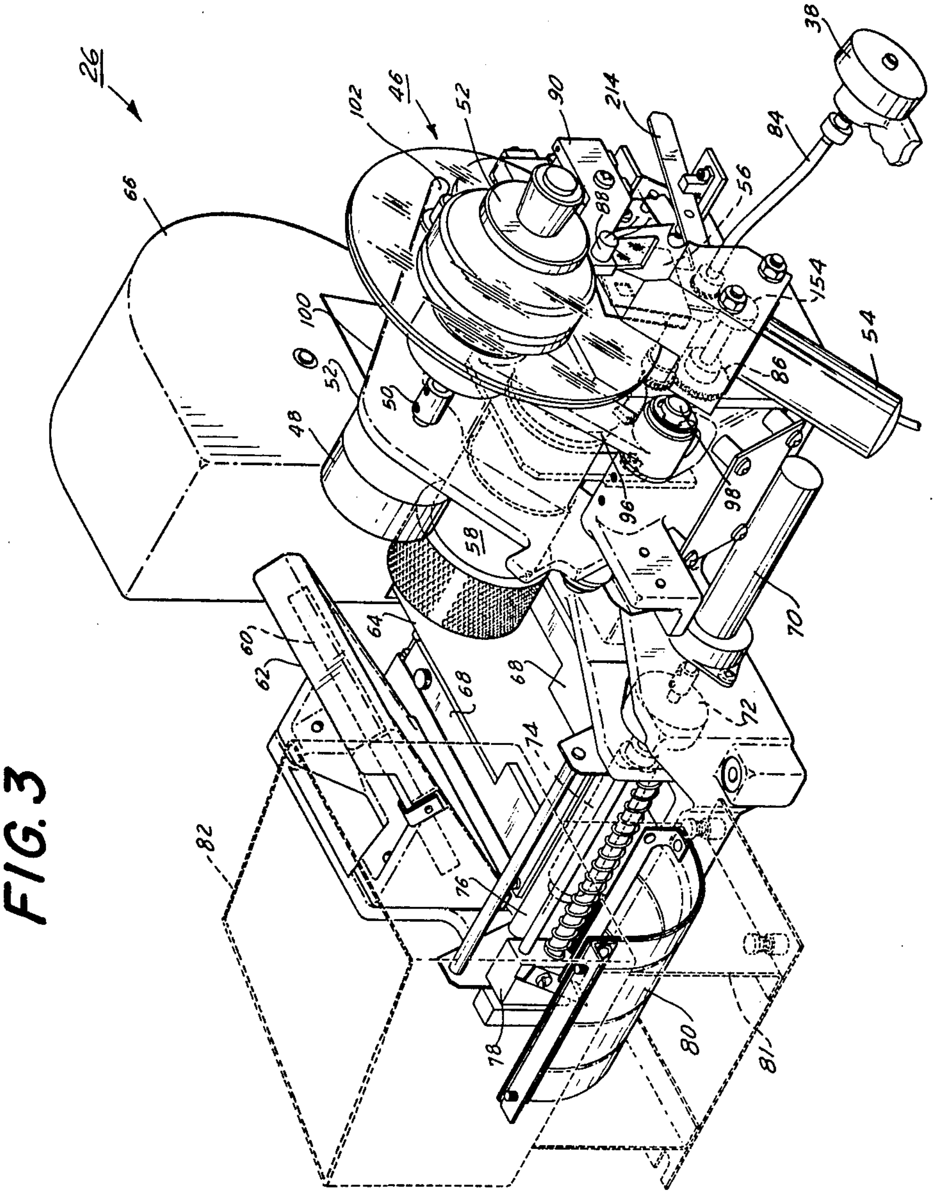
FIG. 3 is a perspective view, partially schematic, of the mechanism of the photocomposing machine shown in FIG. 1.

Referring now to FIG. 3 as well as FIG. 1, characters are stored on a rotary character matrix disc 46 which is rotated continuously by a motor 48 which drives the disc through a shaft 50 (FIG. 3). Transparent characters on the disc are illuminated by means of a flash-lamp 54. The timing of the flash lamp is controlled by means of conventional timing slits on the disc, together with a conventional photoelectric slit detector 88.

The character images are projected through a zoom lens 58 which enlarges the images and transmits the enlarged images to a mirror 60 contained in a holder 62. The images are reflected off of the mirror onto a strip 64 of photographic film or paper which is stored in a cassette 66.

The strip 64 is pulled out of the cassette 66, from right to left in FIG. 3, by a paper feed mechanism including a servo motor 70 and feed rollers 74 and 76. The paper is driven towards a curved paper guide 80 in a housing 81 and upwardly into a film-receiving box 82 in which there is located a light-tight film take-up cassette (not shown) which stores the film until it can be removed from the machine for development. The take-up cassette can be loaded and unloaded in the machine through a hole 92 (FIG. 1) which is located in the top of the cover of the machine, immediately above the box 82.

The machine 20 operates in two different modes; the manual or "immediate" mode, and the "store text" mode.

In the "immediate" mode, every time one of the character keys on the key set 28 is depressed, a character image is projected onto the photographic film or paper strip 64, and the paper is automatically driven to the next exposure position for the following character by the paper feed mechanism. Thus, the paper feed mechanism serves as the character spacing mechanism. When composition is complete, the operator cuts off the exposed strip of photographic paper by operating a manual knife lever 94 (FIG. 1), and removes the film take-up cassette from the machine for development. The developed film or paper strip then can be pasted-up or otherwise used in making printing plates, in a well-known manner.

In the "store text" mode, a series or whole line of characters is composed before any characters are flashed onto the film. The identification and width codes of characters being composed are stored in a memory. The widths of the characters and spaces are accumulated and the total is shown as the "line measure" in displays 34 and 36. When the line has been composed and the operator is satisfied with the job, he presses the "expose" button 43 (FIG. 2), and the machine automatically exposes the characters on the film, in the correct sequence and with proper spacing.

The construction and operation of the photocomposing machine now will be explained in greater detail.

CHARACTER MATRIX

Figure 11:
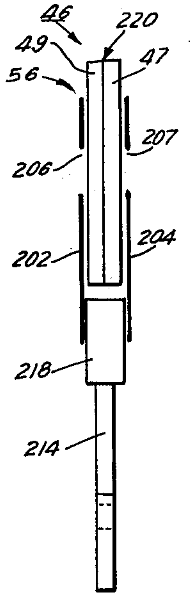
FIG. 11 is an end elevation view of the structure shown in FIG. 10.

Referring now to FIG. 11 as well as FIG. 3, the character matrix disc 46 consists of two glass plates 47 and 49 with one or more pieces of film 220 between the plates. This assembly is held together by means of a conventional quick-release mounting structure 52. By use of the structure 52, the film between the plates 47 and 49 easily can be replaced to change the master characters of the disc.

Figure 4:
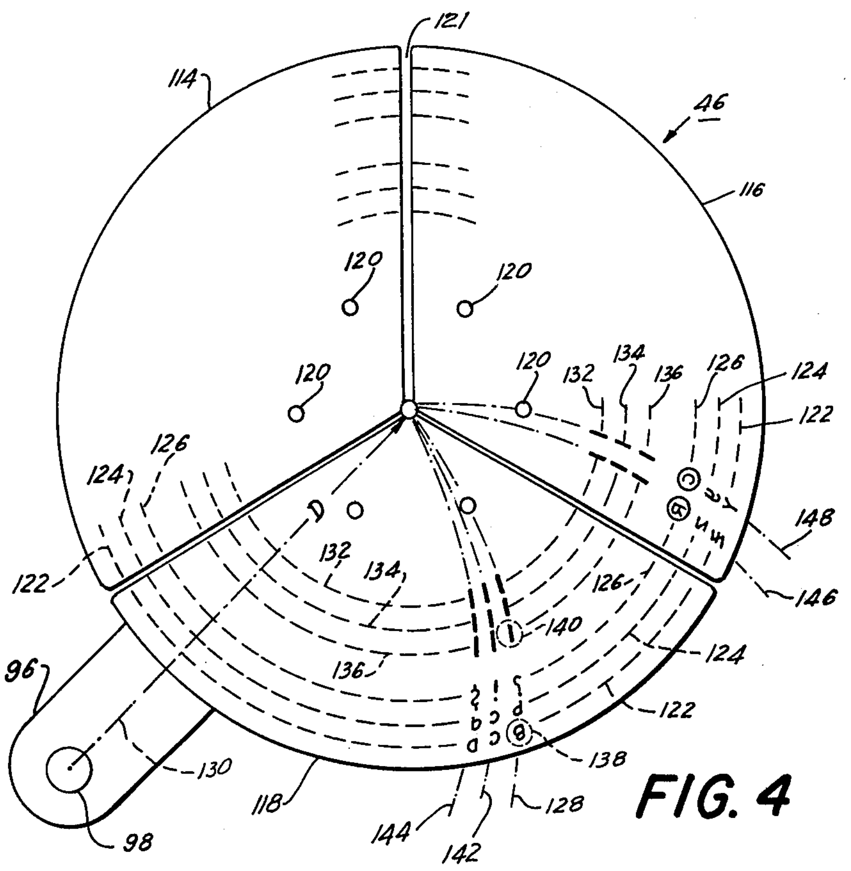
FIG. 4 is an elevation view, partially schematic, of a character matrix disc constructed in accordance with the present invention.

The machine 20 is designed to operate using character matrices of two different types, a segmented matrix, and a non-segmented matrix. The preferred segmented matrix is shown schematically in FIG. 4. FIG. 4 shows three film segments 114, 116 and 118 which are fastened together between the plates 47 and 49 in order to form a complete disc. Plates 47 and 49 are not shown in FIG. 4. The film segments are held in place by means of pins (not shown) inserted through holes 120 in one portion of each of the segments.

Each film segment contains three concentric rows of characters 122, 124 and 126, and three concentric rows of slits 132, 134 and 136. Preferably, one complete font on characters in one style is contained on each segment. Each font has a total of 126 characters, comprising upper-case characters, lower-case characters, and so-called "super-shift" characters. In a machine which has been built in accordance with this invention, 6-point master characters are used with a zoom lens with a magnification ratio of from three to twelve to produce characters of from 18 to 72 point size.

The start of each segment is detected by the passage of one of the gaps between segments past the photo detector 88. One gap 121 between two of the segments is wider than the other gaps, and is used as a reference mark to indicate when the disc has turned through one complete revolution.

Now, in order to understand the arrangement of the characters on the film segments, it is necessary to examine some of the details of the illumination system.

Figure 10:
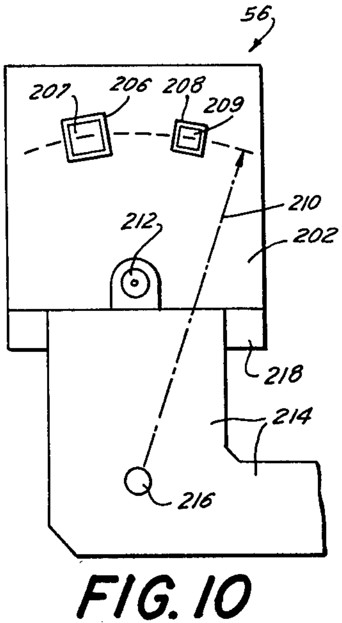
FIG. 10 is a side elevation view of another component of the machine of FIGS. 1 and 3, partially broken away.
Figure 9:
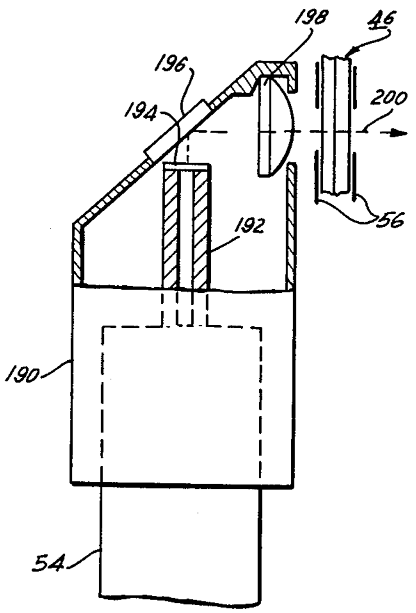
FIG. 9 is a partially cross-sectional elevation view of a component of the machine shown in FIG. 1.

Referring again to FIG. 3, and also to FIGS. 9 and 10, the light from the flash lamp 54 is reflected through a 90° angle by a mirror 196 before passing through a lens 198 and the disc 46. The light passes through a hole in a mask 56 which prevents images from unwanted characters from being projected. As it is shown in FIG. 3, the slit detector 88 is mounted just above the point of entry of the light from the flash lamp through the disc.

The disc structure 46 is mounted on a support structure 96 which is mounted pivotably on the main support structure by means of a shaft 98.

Figure 5:
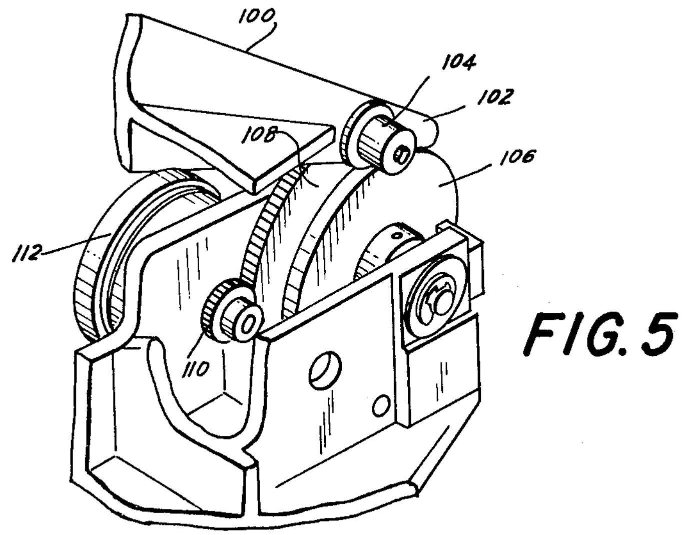
FIG. 5 is a perspective, partially broken-away view of a portion of the machine shown in FIG. 1.

Referring now to FIGS. 1 and 5, another portion 100 of the support structure 96 has a projecting lower end 102. A roller 104 is attached near the end 102. The roller 104 is above and rests on the surface of a cam 106 which is driven by a stepping motor 112 through gears 108 and 110. The stepping motor 112 drives the cam 106 so as to lift or lower the roller 104, and thus lift or lower the right end of the disc support structure. This pivots the disc 46 about the shaft 98 so as to raise and lower the disc relative to the flash lamp 54 and slit detector 88 to change rows on the disc; that is, to select characters from one row instead of another on the disc.

Referring now to FIG. 4, the structure of segment 118 now will be explained. The structure of the other segments 114 and 116 is the same so that the description of segment 118 will suffice for all.

Preferably, the characters in the outer row 122 are upper-case characters, those in the middle row 124 are lower case characters, and those in the inner row 126 are "super-shift" or special characters. The "super-shift" characters are shown on the character keys in FIG. 2, and include mathematical symbols, dollar signs, etc. They include the symbols in the upper left corner of keys 2 through 11 and 18 through 27, and the symbols in the lower right corner of keys 32 through 42 and 47 through 55. The upper-case row is selected by use of the "shift" keys 46 and 56, and the "super shift" row by use of the "super-shift" key 45.

In accordance with one aspect of the present invention, each row of characters 122, 124 and 126 is spaced from the other by approximately the same distance as the rows 132, 134 and 136 of slits are spaced from one another. The slits in the outer row 136 are used to time the flashing of the characters in the outer character row 122; the slits in row 134 are used for characters in row 124, and the slits in row 132 are used for the characters in row 126. Thus, there is one and only one slit to time the flashing of each of the characters. Furthermore, that slit is near the character and is aligned along the circumference of an alignment circle shown at 128 in FIG. 4. Additional alignment circles are shown at 142 and 144, and at 146 and at 148 for segment 116. The center of the circle 128 is at the center of shaft 98, its radius is D, and the circle preferably passes through the center of the disc 46.

The location of the beam of light from the flash lamp is indicated by the dashed-line circle 138 in FIG. 4. Similarly, the operative detection area of the slit detector is shown by dashed-line circle 140. Both circles 138 and 140 are centered on the alignment circle 128, and will be aligned on each other circle 128, 142, 144, 146, 148, etc. when that circle moves into the position occupied by circle 128 in FIG. 4. When the disc is lowered by operation of the cam 106 (FIG. 5) so as to select a different row of characters, movement of the disc is along one of the alignment circles. Since the spacing of the character rows from one another is the same as that of the slit rows, the character in the newly-selected row will be aligned with the slit in the next row automatically without movement of either the slit detector or flash lamp mechanism. In this manner, a highly precise relationship is maintained between each slit and its corresponding character, while at the same time, the row changing mechanism is kept very simple.

It should be noted that each of the alignment circles 128, 142, 144, 146 and 148, and all others on the disc, will have the point 98 as its center only when it is in the projection position indicated by the dashed lines 138 and 140. However, of course, the radius D of each of these alignment circles is the same.

The segmented disc shown in FIG. 4 preferably is used in composing characters with relatively small point sizes. For example, the characters on the segments preferably are of 6-point size to produce composition in the range of 18 to 72 points, as it has been explained above.

The non-segmented disc (not shown) has characters of 12 point size to produce composition in the range of 36 to 144 points. On this disc there are only two rows of characters and two rows of slits. The film forming the disc bears only one font of characters. As with the segmented disc, the characters in adjacent rows and the corresponding slits are aligned along alignment circles such as the circle 128 so as to facilitate the shifting from one row of characters to the next.

The mounting arrangement for the matrix disc is advantageous not only for the reasons given above, but also it greatly facilitates the changing of matrix discs. The disc swings upwardly counter clockwise about the shaft 98 to a position at which it is completely free of the mask 56 and slit detector and can be removed and replaced easily.

ZOOM LENS CONTROL

Referring again to FIG. 3, the control of the magnification of the zoom lens 58 is done by means of a conventional mechanism consisting of a knob 38 connected to a flexible rotary drive shaft 84, which is coupled to a set of gears 86 which drive the size adjustment ring on the zoom lens. The details of the structure of this mechanism will not be described in detail, since they are well known.

Figure 6:
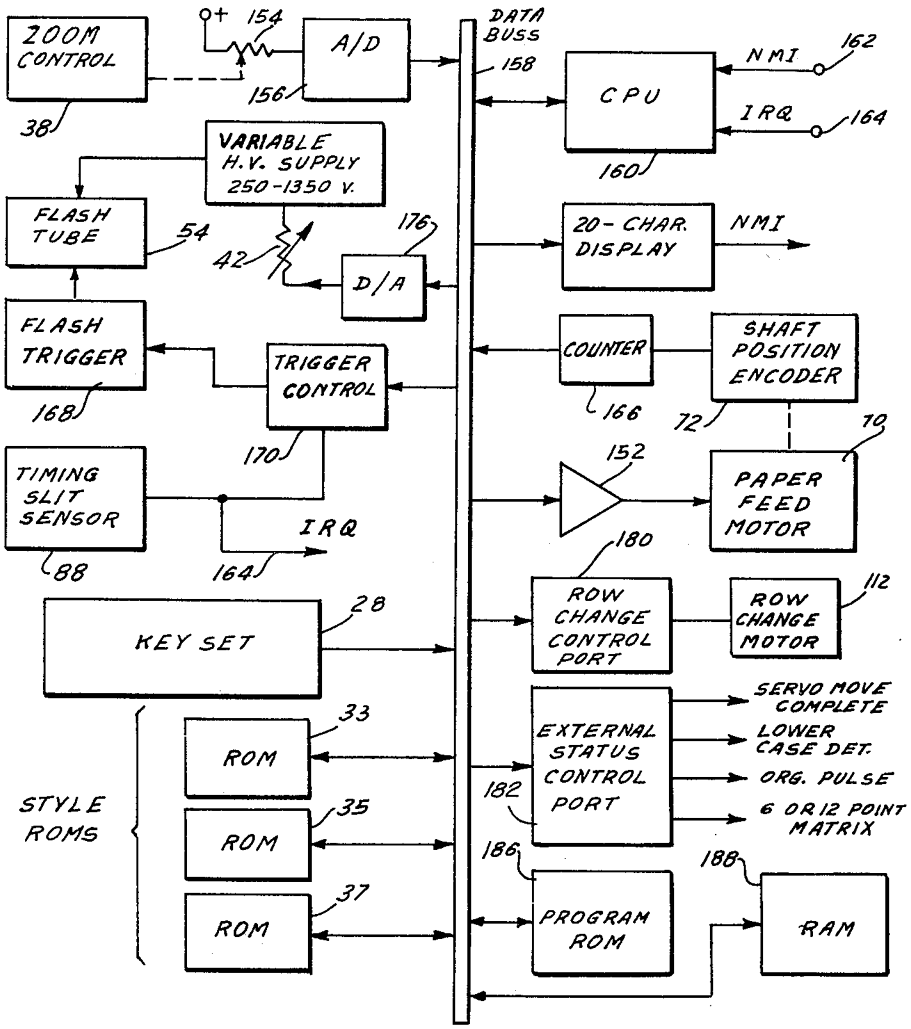
FIG. 6 is a schematic circuit diagram of the control circuit for the machine shown in FIG. 1.

One of the problems inherent in using a manual zoom setting is that it is difficult to determine the precise point size at which the knob 38 is set. This problem is alleviated, in accordance with another aspect of the present invention, by the connection of the output of the shaft 84 to a potentiometer 154 (FIGS. 3 and 6) which converts the position of the shaft 84 into an analog voltage. That voltage is converted into digital form by an analog-to-digital converter 156 (FIG. 6).

The change in magnification by the zoom lens is not linear with the distance of rotation of the control ring. Therefore, the potentiometer 154 is of the logarithmic type, with its logarithmic characteristic curve roughly matched to the corresponding curve of the zoom lens control. Any additional corrections required are stored in the program ROM 186 (FIG. 6), so that the digital signals supplied to the size display 32 (FIG. 1) correspond exactly to the actual point-size of characters being composed. The values stored in the ROM 186 necessary to do this preferably are determined empirically.

By means of the foregoing, the relatively expensive stepping motor and its control circuitry which usually is used for the zoom control is eliminated. This produces a reduction of cost, size and complexity, without impairing the quality and ease of operation of the machine.

CONTROL CIRCUIT AND PROGRAM

FIG. 6 is a schematic block diagram of the control circuit for the machine shown in FIGS. 1 through 5. At the heart of the circuit is an integrated-circuit microprocessor or CPU unit 160, for example of the type Z-80 made by the Zilog Company. The CPU unit 160 is connected to a data buss 158. As it is shown in the lower portion of FIG. 6, a program read-only memory ("ROM") 186 and a random access memory ("RAM") 188 also are connected to the data buss. The program ROM, as it is well known, contains the permanent program which controls the operation of the micro-processor. The random-access memory provides temporary storage for use by the CPU in its operation, and also serves as the buffer storage unit for character identification and width codes, etc. as needed.

The CPU has two interrupt lines 162 and 164. Line 162 receives a "non-maskable" interrupt signal NMI (that is, an interrupt signal which cannot be disabled) from the character display unit 30. Every time a new character is selected at the keyboard, an interrupt routine is started to cause the new character to be displayed.

A second interrupt line 164 receives a signal from the timing slit sensor 88 and provides a maskable interrupt signal. Thus, when a timing slit passes the timing sensor, an interrupt signal IRQ is delivered over line 164 to start an interrupt routine, which will be described in greater detail below.

The function of the zoom control mechanism 38, potentiometer 154 and A/D converter 156 have been described above. The output of the A/D converter 156 is coupled to the data buss 158, and then to the RAM 188 and the set size display 32.

The flash control circuit shown in FIG. 6 includes the flash tube 54, and a flash trigger circuit 168, both of which are of conventional construction. The trugger circuit 168 is controlled by a conventional trigger control circuit 170 which is connected to the data buss 158. The trigger control circuit 170 is timed in its operation by the timing slit signals generated by the timing slit sensor 88. The slit sensor device 88 is well known, and typically consists of a lamp shining light through the slits in the disc into a photocell on the opposite side of the disc, as is well known.

In accordance with one aspect of the present invention, the voltage supplied to the flash tube 54 is controlled in accordance with the size of the characters being composed so as to insure reasonably uniform density of exposure despite size changes. The electrical energy supplied to the flash tube 54 is supplied from a variable high-voltage supply 172. The voltage from the supply 172 is controlled by an input signal from an analog signal from a digital-to-analog converter 176 through the exposure control potentiometer 42 (also see FIG. 1).

Converter 176 receives from the data buss the digital point size signals indicating the setting of the zoom control 38. The exposure control potentiometer 42 sets the base level of the flash intensity. This base level usually is set for a given type of film and then is left unaltered until a different type of film is used. During type composition, as the size of the characters changes, the voltage delivered to the flash tube 52 is varied automatically in accordance with the character size signals so as to increase the voltage for larger sizes and decrease it for smaller sizes, and thus maintain a relatively uniform density of the characters on the film. This is possible because the amount of light delivered by the flash tube 54 varies directly with the voltage supplied.

The capstan motor 70 for driving the paper or film receives signals from the data buss 158 through a servo amplifier 152. A shaft-position encoder 72 (also shown in FIG. 3) encodes the position of the capstan motor and delivers a coded signal to a counter which feeds its output signal back to the data buss 158. That signal is compared with the desired position signal in order to stop the motor 70 at the desired location and thus accurately control the movement of the film.

The keyboard 28 delivers character and control signals to the rest of the control circuit through the data buss 158.

The row change motor 112 receives from the data buss 158 row change signals through a row change control port 180, of conventional construction. Similarly, the line measure displays 36 and 34, and the size display 32 receives signals from the data buss through a control port 182. Additionally, other control signals are delivered through an external status control port 184 to indicate that (reading from top to bottom in FIG. 6) the servo motor movement is complete; that lower case has been selected; that the single wide timing slit (not shown) on the disc 46 or "original pulse" has been detected; and that 6 or 12 point size has been selected. These signals are used in a known manner to control the operation of the machine.

The style ROMs 33, 35 and 37 also are connected to the data buss 158. Only one of these ROMs is activated at any given time, depending upon which of the style selection keys on the keyboard (FIG. 2) is activated.

Stored in each of the style ROMs is the relative width information for each character in a given style, as well as kerning information for kernable pairs of characters in that style; white-space reduction values; "thin-space"; "EM" and "EN"; and "unit space" values for use with that style.

OPERATIONAL SEQUENCE

Figure 7:
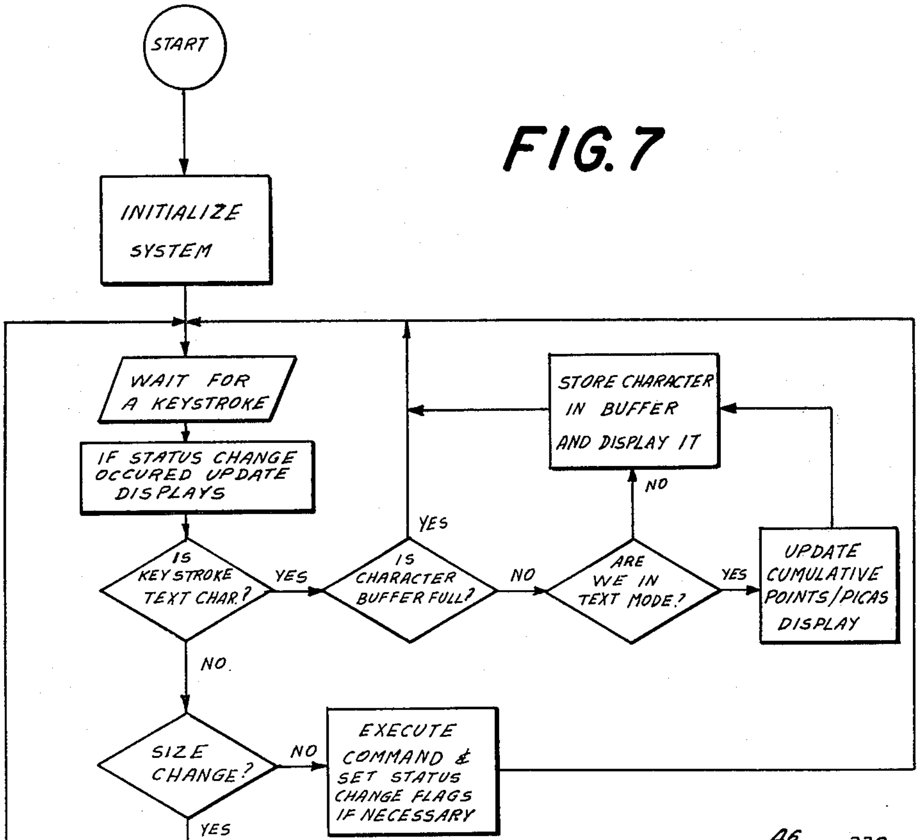
FIGS. 7 and 8 are program flow charts for the program used in connection with the circuit of FIG. 6.
Figure 7:
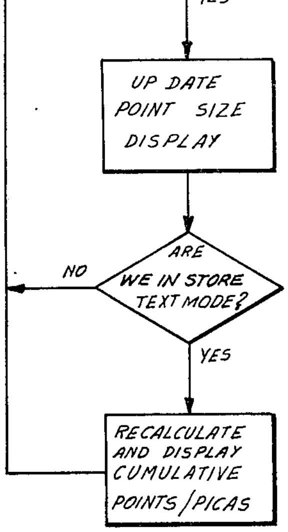
Figure 8:
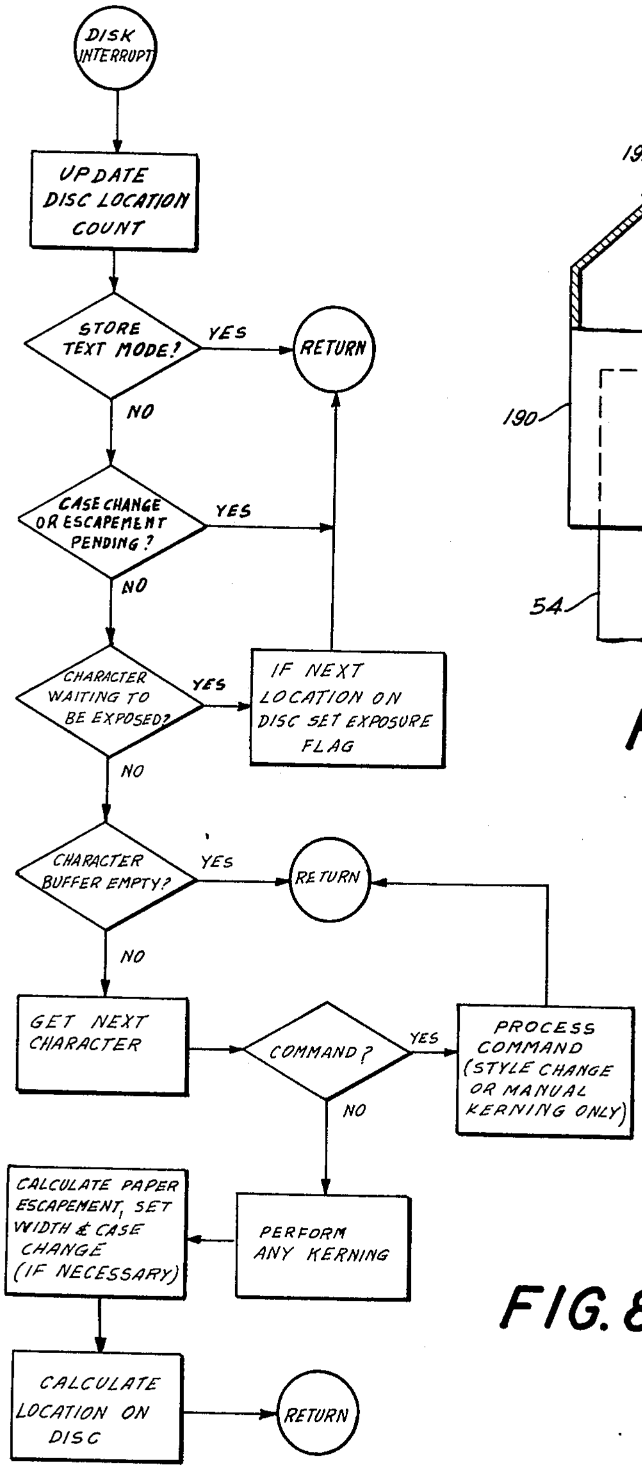

FIG. 7 shows the overall control program for the photocomposing machine, and FIG. 8 shows the interrupt routine which takes place each time a timing slit is detected. With reference to FIGS. 7 and 8, the operation of the machine now will be described.

First to be described will be the "immediate" mode of operation and then the "store text" mode.

A. "Immediate" Mode

When the power to the machine is turned on, it is automatically in the "immediate" mode of operation. In this mode, each character is flashed substantially immediately when a key is pressed.

Referring now to FIG. 7, first, the system is initialized. The initialization procedure consists of clearing the registers, displays and buffers. Then, the machine sets itself to lower case, style #1, and displays the type size in the display window 32. The synchronous disc drive motor 48 is energized.

The system now is in the "wait for a key stroke" mode in which the disc is spinning but nothing else will happen until a key stroke occurs.

Next, the key for the first character to be composed is depressed. A code identifying the first character is stored in the buffer 188 (FIG. 6) and the character is displayed in the display window 30 on the front of the machine. Also, the character is flashed.

The flashing of the character is performed in accordance with the interrupt routine shown in FIG. 8. As it has been stated above, each timing slit actuates the interrupt sequence shown in FIG. 8. A counter counts the location of the disc relative to the wide starting slit. This counter is updated by one count. Then it is determined whether the machine is in the store text mode. If it is, the process returns to start. If not, it is determined whether a case change or escapement is pending and whether a character is waiting to be exposed.

Since there is no character waiting to be exposed at this time, it is next determined whether the character buffer is empty. Since the initial character code has been stored in the buffer, the "get next character" routine is enacted, and the character code is retrieved from the buffer. Then it is determined whether the code is a command code such as for a style change or for manual kerning. If not, then the machine performs any necessary kerning, and calculates the paper escapement, set width and case change, if necessary. After that, the location of the character on the disc is calculated, and the sequence is returned to start.

During the interrupt sequence initiated by the next timing slit, it will be determined that a character is waiting to be exposed. Then a determination is made as to whether the character is in the next location on the disc. If it is, an exposure flag is set so that, upon the detection of the next timing slit, the flash lamp will flash the character.

It is to be noted that the first character which is flashed needs no paper escapement calculation. In fact, the paper does not move until the next character key has been depressed and a character spacing calculation has been made.

When the next character key is depressed, the character is displayed on the display 30 and its code is stored in the buffer. Now it is necessary to calculate the paper escapement value in order to properly space this character from the previous character. The steps in this procedure are as follows: First, the selected one of the three width ROMs 33, 35 and 37 is addressed. The relative width of the previous characters is retrieved. Also, it is determined whether the character is one which is kernable. The identification of those characters which are kernable is stored in the width ROM. Additionally, it is determined whether the second character in any pair is kernable with the first character. If so, the kerning value is determined. This kerning value is substracted from the relative width of the character. If kerning is not required, then the relative width remains unaltered.

Next, the relative width value, modified by the kerning procedure, is multiplied by a factor proportional to the point "set" on the display 32. This can be set either by the size control 38 for the zoom lens, or by the "set-size" control for the machine; that is, by depressing the "set-size" key (FIG. 2), together with a combination of numerical keys to enter a "set" other than that dictated by the zoom control setting.

Next, a white-space reduction value is subtracted from the product. This white-space reduction value is stored in the ROM and is a constant for a given size of type in a given style. There is one white space reduction value for all sizes within a six-point size range in each style; that is, the white-space reduction value changes once for every six-point change in the size of the type being composed.

The signal resulting from the foregoing calculations is stored in the counter 166 (FIG. 6). As the paper drive motor 70 operates, encoder 72 sends signals to the counter 166 which counts down until it reaches zero, at which time the motor stops.

When the film movement is completed, a signal is generated by the counter 166 which readies the circuit for flashing the next character.

The next character key is depressed to compose the next character, and so on, until a complete sequence of characters has been composed. Then the "END" key 30 (FIG. 2) is depressed. This automatically operates the paper drive motor 70 to feed several inches of film through the system so that the last character composed will be securely housed in the light-tight storage cassette in the box 82 (FIG. 1). Then, the knife lever 94 is operated to cut off the strip of paper. The knife lever 94 slides a support block 78 (FIG. 3), to which a knife blade is attached, along a guide rod against a return spring. The movement is accomplished by way of pulleys and cord (not shown) which fasten the block 78 to the lever 94.

There are several special commands which now will be described.

First, changing the setting of size control knob 38 (FIG. 1) changes the size reading on the display 32, as well as changing the actual size of characters being composed. Referring to FIG. 7, it is seen how the size change indication is implemented. If a size change is detected, the point size display is updated. If the machine is not in the "stored text" mode but is in the "immediate mode", then the system returns to wait for another key stroke. If it is in the "stored-text" mode, a special recalculation and display is performed, as will be described below.

As it has been pointed out above, it also is possible to change the "set-size"; that is, it is possible to change the size displayed in the window 32 by depressing the "set-size" key (FIG. 2) together with numerical keys to enter the amount of the set width. This changes the apparent size of the characters without actually changing the physical size of the characters on the film. That is, the machine is made to think that the characters are larger than they actually are, so as to manipulate the spacing between characters and fit the characters into a desired area or space. Thus, depressing the "set-size" key overrides the size setting from the size control knob 38. Similarly, subsequent operation of the size control knob 38 will override the "set-size" indication.

Another special command can be entered by pressing the "kern" key (FIG. 2), followed by a positive or negative number. This adjusts the relative width of the character by that amount so as to provide manual kerning. This overrides the automatic kerning. On subsequent characters, the automatic kerning mode returns unless the kern key again is pressed. Thus, manual kerning is used for only one character at a time.

The forward ("FWD") key and the reverse ("REV") key (FIG. 2) can be pressed to move the photographic film or paper 64 forward or backward.

Figure 2:
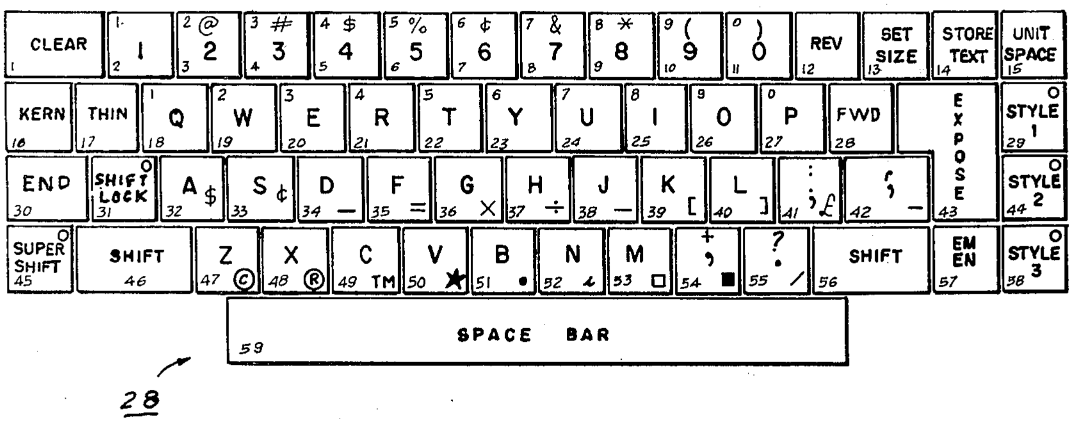
FIG. 2 is a plan view of the keyboard layout of the machine shown in FIG. 1.

Pressing the "CLEAR" key 1 shown in FIG. 2 initializes the system in the manner described above.

The depression of one of the three "style" keys shown in FIG. 2 changes the style selected. This adds 40 or 80 counts to the position counter which locates the characters in one of the three segments of the disc. The counter is started by the wide pulse, and then each character is located with respect to the wide pulse. Thus, for example, if the disc segment selected were immediately following the location of the wide pulse, each character would be located at one of 40 locations which would be from 1 to 40 counts away from the wide slit. However, if the next disc were selected, each character would be located by 40 counts plus from 1 to 40 additional counts, etc.

The operation of one of the "style" keys also enables the ROM corresponding to that style, and disables the other style ROMs.

STORED TEXT MODE

In the "stored-text" mode of operation, the operation of the machine is the same as in the "immediate" mode, with the exception that instead of flashing each character immediately, the character codes are stored until a sequence or line of characters has been composed.

Referring now to FIG. 8, during each interrupt routine, it is determined whether the machine is in the "stored-text" mode. If it is, rather than going through the remainder of the routine necessary to flash the character, the system merely returns to its initial condition.

Now referring to FIG. 7, each time a character key is depressed while the machine is in the "stored-text" mode, the character is displayed in the character display window 30, and its character code is stored in the buffer memory. However, unlike the "immediate" mode, the points and picas displays 34 and 36 are updated for every character. Thus, the widths of the characters, in picas and points, are accumulated so as to tell the operator the total measure of his composition at all times.

Finally, when the line is complete and the operator wishes to print it, he pushes the "EXPOSE" button (FIG. 2), which takes the machine out of the "stored-text" mode. Then, the character flashing sub-routine of the interrupt routine shown in FIG. 8 becomes effective, and each character is flashed in a first-in, first-out sequence. The spacing for each character is computed, the paper is moved, and each character is flashed, all in the manner described above. Finally, when the character buffer is empty, the system returns to start, ready for the composition of another line.

In accordance with one very desirable feature of the present invention, the line measure display 34, 36 is automatically revised when there is a size change during the composition of a line. This is illustrated in FIG. 7 where it is determined whether there is a size change. If there is, then the point size display is updated to show the new point size. This can occur either by operation of the size control knob 38, or by operation of the "set-size" button shown in FIG. 2, as described above. The codes of the stored characters then are retrieved from storage, the new width of each is re-calculated, using the new size, and the new measure or total of the new widths is calculated, and the new measure is displayed. The system then returns to wait for another key stroke.

FLASH LAMP

FIG. 9 is a partially cross-sectional view of the flash-lamp 54 and its housing 190. The light must be reflected through an angle of 90° so as to avoid having the flash-lamp tube 54 extend too far forward and make the housing of the machine too large. Thus, light from the flash tube is reflected off of a 45° front-surfaced mirror 196, along an optical axis indicated by the line 200, through a focusing lens 198, to the disc 46.

In many flash lamps, the illumination produced is not even nearly uniform over the area covered by the light. This is especially true when the light is spread over a relatively large area, as it is when composing characters of a relatively large size. This problem is alleviated by interposing a light diffuser in the form of a piece 194 of matte-finish Mylar plastic film in the path of the light from the lamp. This diffuses the light and gives it a relatively even distribution over the cross-section of the light beam.

The diffusion effect is heightened by the use of a light pipe 192 to conduct the beam to the diffuser. This light-pipe 192 is simply an aluminum tube with a bright, smooth internal surface. This surface reflects the light back and forth and this helps to mix the light.

MASK STRUCTURE

Figure 12:
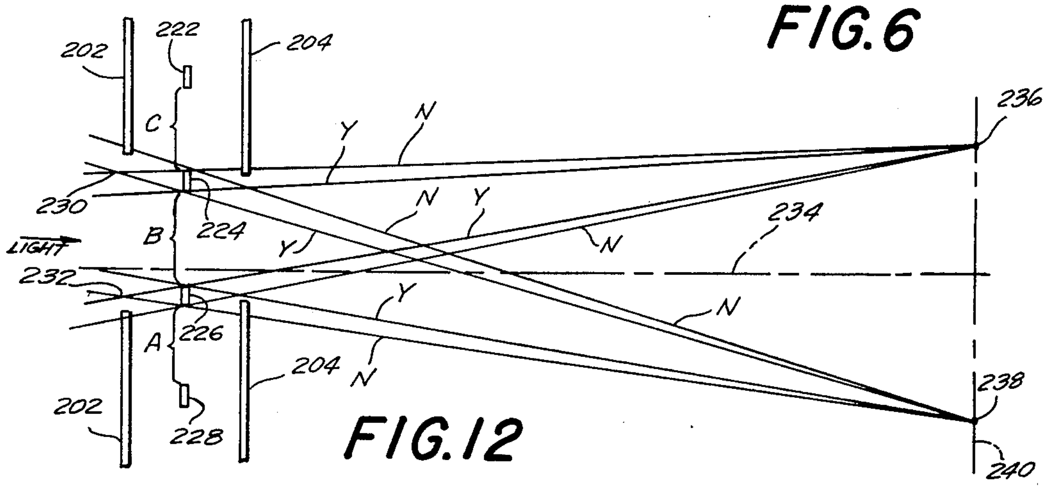
FIG. 12 is a schematic view of the structure of FIGS. 10 and 11.

FIGS. 10, 11 and 12 show the structure and operation of the mask 56. The purpose of the mask 56 is to mask out all areas of the disc near the flash lamp, other than the area containing the character to be flashed.

Referring to FIGS. 10 and 11, the mask 56 includes two thin metal shields 202 and 204 mounted on a plastic mounting block 218 which is pinned at 212 to one end of an L-shaped lever arm 214. The arm 214 is pivoted at 216 to the frame of the machine.

Each shield has a large and a small square hole. In the front shield 202, the large hole is 206 and the small hole is 208. In the rear shield 204, the large hole is 207 and the small one is 209. The large holes are used with large matrix characters, and the small holes are used with small matrix characters. The centers of the holes 206 and 208 are aligned on a circle described by the radius 210 about point 216 as a center. Thus, when a disc bearing 12-point characters is used, the arm 214 is pivoted about point 216 to bring the large holes 206, 207 into operative position, and the arm is pivoted the other direction to bring the holes 208, 209 into position.

The hole 206 in shield 202 is slightly larger than the hole 207 in shield 204, and the hole 208 is slightly larger than the hole 209. The difference in hole sizes is exaggerated in FIG. 10 for the sake of emphasis.

As it is shown in FIG. 11, the two shields 202 and 204 are spaced apart so that the spinning disc 46 fits between them.

FIG. 12 is an enlarged schematic diagram of the shields 202 and 204 and the cross-sections 222, 224, 226 and 228 of the opaque areas of a master character matrix film between two glass plates 47, 49 (not shown in FIG. 12). The areas A, B and C represent transparent character areas in the film. Area B is the selected area through which light from the flash lamp (not shown in FIG. 12) is desired to be projected. The areas A and C are very close to area B, and the object of the shields is to prevent light from traveling through either area A or C to the diaphragm of the zoom lens. The location of the diaphragm is along a plane defined by line 240, and its outer limits are defined by points 236 and 238.

Various light ray traces are drawn in FIG. 12 from points 236 and 238 to the edges of the area B and adjacent edges of areas A and C. The ray traces marked "Y" indicate rays which are to be transmitted ("Yes" rays), and those marked "N" are not to be transmitted and must be blocked.

If a single shield like shield 202 were used, as it is conventional to do in prior art devices, the mask and its location would have to be extremely precise. This would make the shield and its mounting structure prohibitively expensive to make and assemble. The reason for this is that, in order for the shield 202 to block the "N" ray and transmit the "Y" ray at each of the ray junctions 230 and 232, the shield location would have to be correct within very low tolerances because the two rays are extremely close to one another at those points.

In accordance with a further aspect of the invention, by using a second shield 204 on the rear of the disc, and making the hole in it smaller than that in the front shield 202, the undesired rays can be blocked easily without the precision requirement of a single shield. This greatly reduces the cost of the mask and its assembly in the machine.

POWER SUPPLY AND COOLING

Because the use of stepping motors and other energy-dissipating devices has been minimized, the electrical power supply of the machine can be relatively small and inexpensive.

The power supply and the other electrical components dissipate such relatively small amounts of heat that a cooling fan usually will not be needed. Instead, only some cooling vents 95 (FIG. 1) in the rear of the housing 24 need be provided in order to dissipate the excess heat by convection.

The above description of the invention is intended to be illustrative and not limiting. Various changes or modifications in the embodiments described may occur to those skilled in the art and these can be made without departing from the spirit or scope of the invention. In particular, certain features of the invention are identified as being "preferred". This identification is provided solely in order to identify the preferred form of the invention, and is not intended to limit the scope of protection for the invention.

We claim:

1. In or for a photocomposition machine having a character matrix with closely adjacent master characters for projection onto a recording surface, a lamp for selectively illuminating one of said characters for projection, a mask for preventing the projection of graphic matter adjacent a selected one of said characters, said mask comprising a first shield between said lamp and said matrix, and a second shield between said matrix and said recording surface, each of said first and second shields having an aperture aligned with the aperture in the other shield to transmit the image of said selected character, said mask and said matrix being movable with respect to one another in order to select one among a plurality of characters on said matrix for projection.

2. A device as in claim 1 in which each of said shields is closely adjacent said matrix, and means for fastening said shields together.

3. A device as in claim 1 in which said matrix is a rotatable disc bearing concentric rows of characters, said disc being movable in a direction transverse to said rows to select among said rows of characters.

4. A device as in claim 1 including lens means for enlarging character images before they reach said recording surface, said second shield being located between said matrix and said lens means.

5. A device as in claim 1 in which said character matrix comprises a planar character-bearing member and at least one planar support member for supporting said character-bearing member.

6. A device as in claim 5 including a second one of said planar support members, said planar support members being positioned on opposite sides of said character-bearing member.

7. A device as in claim 6 in which said character bearing member is a piece of photographic film, and said support members are glass plates, and means for holding said glass plates tightly against said film.

8. In or for a photocomposition machine having a character matrix with closely adjacent master characters for projection onto a recording surface, a lamp for selectively illuminating one of said characters for projection, a mask for preventing the projection of graphic matter adjacent a selected one of said characters, said mask comprising a first shield between said lamp and said matrix, and a second shield between said matrix and said recording surface, each of said first and second shields having an aperture aligned with the aperture in the other shield to transmit the image of said selected character, the aperture in one of shields being smaller than the aperture in the other of said shields so that said one shield blocks the transmission of light rays missed by said other shield.

9. A device as in claim 8 in which said one shield is said second shield.

10. In or for a photocomposition machine having a character matrix with closely adjacent master characters for projection onto a recording surface, a lamp for selectively illuminating one of said characters for projection, a mask for preventing the projection of graphic matter adjacent a selected one of said characters, said mask comprising a first shield between said lamp and said matrix, and a second shield between said matrix and said recording surface, each of said first and second shields having an aperture aligned with the aperture in the other shield to transmit the image of said selected character, each of said shields having another aperture of a size different from that of the first-named aperture, means for mounting said shields to pivot about an axis, said apertures on each shield being aligned along an arc whose center is on said axis.

* * * * *